H. ROTERMUND.
METHOD OF RECOVERING AMMONIA FROM COAL GASES AND THE LIKE.
APPLICATION FILED DEC. 3, 1910.
1,067,843.
Patented July 22, 1913.
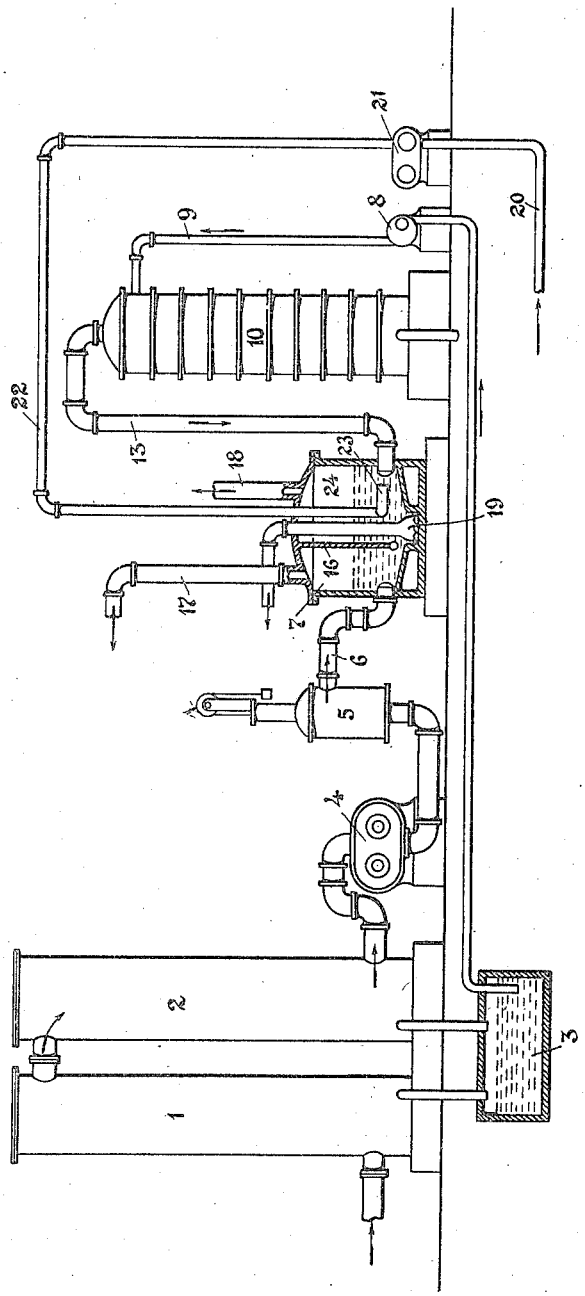

UNITED STATES PATENT OFFICE.

HERMANN ROTERMUND, OF DUSSELDORF, GERMANY, ASSIGNOR TO ACTIEN-GESELLSCHAFT FUER KOHLENDESTILLATION, OF DUSSELDORF, GERMANY, A CORPORATION OF GERMANY.

METHOD OF RECOVERING AMMONIA FROM COAL-GASES AND THE LIKE.

1,067,843.   Specification of Letters Patent.   Patented July 22, 1913.

Application filed December 3, 1910. Serial No. 595,346.

*To all whom it may concern:*

Be it known that I, HERMANN ROTERMUND, a subject of the Emperor of Germany, residing at Dusseldorf, Germany, have invented new and useful Improvements in the Methods of Recovering Ammonia from Coal-Gases and the Like, of which the following is a specification.

My invention relates to the application of positive heat to that portion of the acid chamber which carries the outlet for aqueous vapors and noxious gases and has for its object to maintain the concentration of the acid which was in said chamber and of the ammonium salts by counteracting the tendency of the solution to absorb aqueous vapor. This object is preferably obtained by causing a current of hot air or hot products of combustion to pass through the saturater bath or over its surface.

The process to which this invention generally relates is fully described in United States Letters Patent No. 969,907, dated September 13, 1910, to J. A. Roelofsen to which reference is made for the purpose of avoiding a complete restatement of that process.

The invention will be clearly understood from the following description.

The drawing illustrates one arrangement of the apparatus in which my invention may be carried out, showing particularly the application of hot products of combustion as passing through the saturater bath.

The hot gases coming from the coke oven, retorts or other gas making apparatus are completely cooled in the coolers 1 and 2, thereby condensing the tarry vapors and also the aqueous vapor, containing most of the ammoniacal salts not volatile at ordinary temperatures, as well as some volatile ammonia; these condensates are collected and separated in tank 3. The gases to be treated, after having been cooled, pass through a gas pump 4 and a tar extractor 5, which separate the residual tarry vapors, and without being reheated, are conducted through pipe 6 into a lead-lined saturater 7. The condensed ammoniacal liquor from tank 3 is delivered, by means of a pump 8, through pipe 9, into ammonia still 10, an alkali, such as lime, is also introduced, the ammonia thus liberated passes through pipe 13 with or without super-heating into saturater 7.

The saturater 7 is divided into two compartments by means of the diaphragm 16, which dips into the acid solution of ammonium salt contained in the saturater 7. The gases of carbonization enter into one of these compartments, through the perforations in the end of pipe 6, pass up through the acid solution and leave the saturater, after having thus been freed from all ammonia, by means of pipe 17. The vapors from the ammonia still 10, enter the other compartment 24 of the saturater 7, through the perforated end of pipe 13. The ammonia contained in these vapors is thereby absorbed, while the aqueous vapor and gases which may contain hydrogen sulfid, carbonic acid and other noxious compounds, pass out of the saturater, through pipe 18. Into this chamber 24 of the saturater is introduced, by means of pipe 20, blower 21 and inlet pipe 22, a current of hot air or products of combustion. These may be introduced below the surface of the bath through the head 23 as shown in the drawing, or may impinge on its surface or be applied in any other suitable manner. In this way by regulating the quantity of hot air or products of combustion, by means of blower 21, the concentration of the bath may be kept at any desired point and thereby prevent a lowering of the concentration of the acid solution, which would prevent the ammonium salt from separating in the solid state. The ammonium salt is removed from the saturater by means of the ejector 19 and there is a continuous fresh supply of sulfuric acid to the entrance chamber of the concentrator 7 to maintain therein a substantially constant quantity of liquid.

It is important that when the heating gases are introduced into the chamber 24, either upon the surface of the bath or below it, that said heating gases should be free from chemical substances, which might have a tendency to enter into combination with the liquid or affect the relative chemical purity of the solution. Hot air or air containing carbon dioxid is satisfactory for this purpose. A very convenient and economic source of heat is that furnished by the gases (of combustion which have heated the oven walls) and in the drawing I intend that the arrow facing the pipe 20 is to represent a connection with the outgoing combustion gases of the oven. It is apparent that the hot gases may be obtained in other ways, the essence of the invention being the direct application of heat to the liquid in the chamber 24 of the concentrator. As an illustration of the temperatures employed in giving approximate figures only, it will be seen that the gases which enter the concentrator 7 through the pipe 6 are cool gases. The ammonium carbonates, sulfids and other products which come over from the still 10 may have a heat of approximately 100° C. In order to maintain the bath in the chamber 24 at a concentration of 24° to 33° Baumé, the heating gases entering the said chamber through the pipe 22 will be at 200° to 250° C.

Having now described my invention, what I claim is:

1. That improvement in the method of recovering ammonium salts in gases of carbonization which comprises the introduction of cool purified gases of carbonization into one portion of an acid solution and the simultaneous introduction of distilled ammoniacal products into another portion of said solution and conducting relatively hot gases to and causing the same to become operative on that portion of the solution which absorbs the ammoniacal products and maintaining the heat of said gases during their passage to said solution so that substantially their full heat value will become operative upon said portion of the solution.

2. The method of recovering of ammonium salts from gases of carbonization which comprises cooling the gases to separate therefrom the tarry matter and to condense part of the aqueous vapor containing most of the non-volatile ammonia compounds contained in the gases and a portion of the volatile ammonia compounds, distilling said ammoniacal condensate, and then simultaneously introducing said gases into one division of a single acid solution of ammonium salts and—into another division—the vapors of distillation of the said ammoniacal condensate together with a separate current of hot neutral gas, and separately leading off the gases of carbonization and the noxious gaseous components of the vapors of distillation together with the said heating gases, from the saturater.

3. The method of recovering ammonium salts from the gases carbonization which comprises the cooling of the gases and separating therefrom an ammoniacal condensate comprising the tarry matter and most of the aqueous vapor containing non-volatile ammonia compounds and a portion of the volatile ammonia compounds, and then simultaneously introducing said gases of carbonization so treated, the vapors of distillation of the ammoniacal condensate, and the current of hot neutral gas independently into a single acid solution of ammonium salts and separately leading off the gases of carbonization and the noxious gaseous components of the vapors of distillation together with the gases used for heating.

In testimony whereof, I have hereunto set my hand and seal in the presence of two subscribing witnesses.

HERMANN ROTERMUND. [L. S.]

Witnesses:
 ALFRED HENKEL,
 WALTER VONNEGUT.